Patented July 2, 1929.

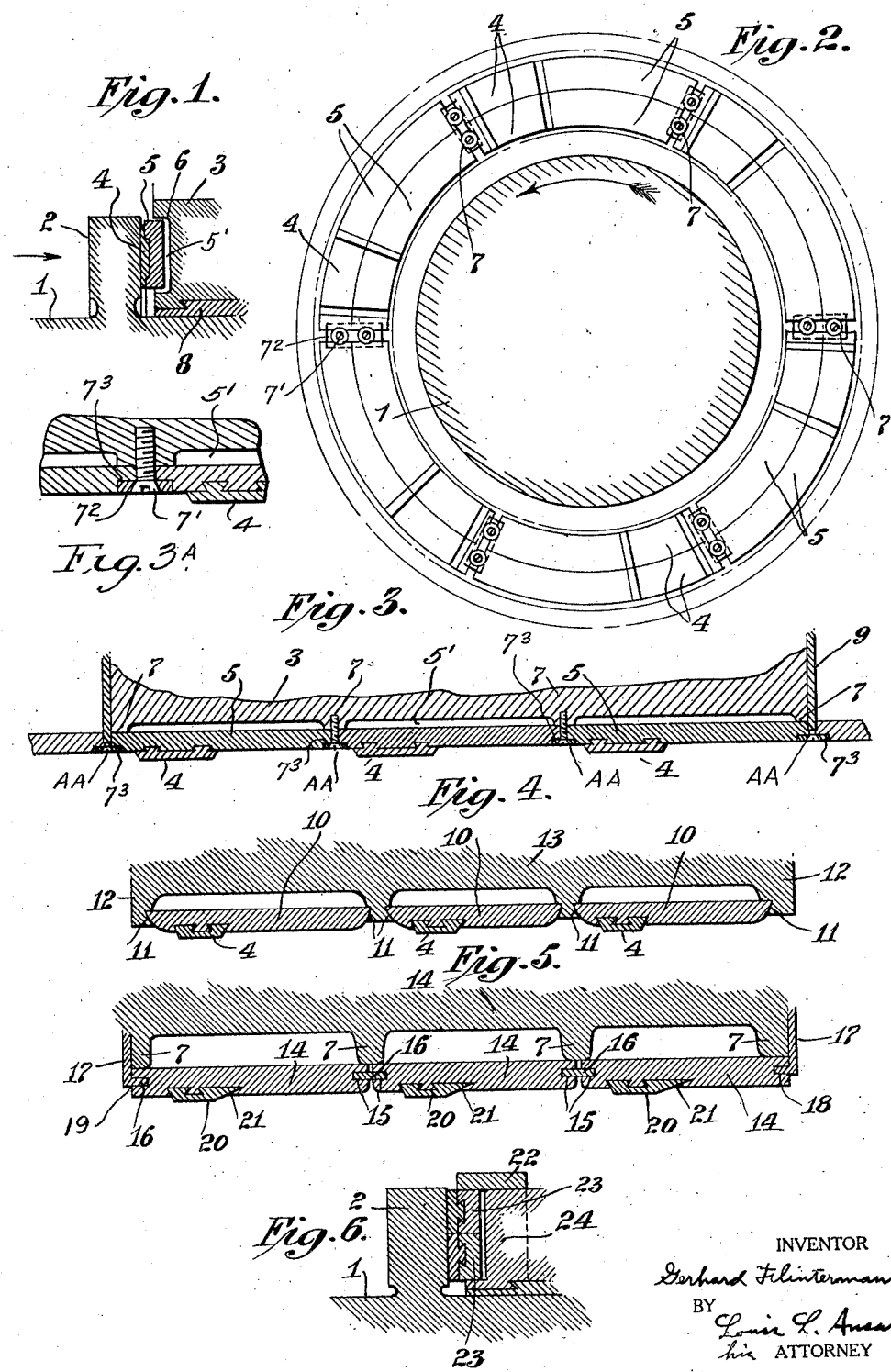

1,719,399

UNITED STATES PATENT OFFICE.

GERHARD FLINTERMANN, OF WEST ORANGE, NEW JERSEY.

THRUST BEARING.

Application filed June 2, 1925, Serial No. 34,282. Renewed November 12, 1928.

This invention relates to thrust or axial pressure bearings and more particularly to bearings of this nature in which, due to the axial thrust, wedge shaped lubricating spaces are formed between the friction surfaces of the stationary bearing element and the relatively abutting surfaces of the rotary bearing element.

In bearings of the class referred to, it has already been proposed to provide an axially-split elastic ring supported on one side by a plurality of displaced abutting surfaces formed on a stationary supporting part with clearances therebetween and relatively abutting with a rotating bearing member, so that, due to the thrust applied to the ring from the rotating member, the halves of the elastic ring will be deformed between their stationary supports to form wedge shaped lubricating and pressure spaces between the active and abutting rotating and stationary bearings surfaces.

Important objects of the present invention are to provide an improved and effective structure for the purpose specified, to provide a construction having functional advantages over the constructions heretofore in use, and to provide means of the class described by which certain disadvantages existing in thrust bearings of the kind specified may be avoided.

Other objects and advantages of the invention are to make such provisions in bearings that a uniform and favorable stretching or flexing of the material of the elastic plates forming the concentric ring sections takes place during deformation and operation, thereby tending to make more uniform the stresses, the deformations, the surfaces of the wedge shaping lubricating and pressure spaces and also the lubricant pressure; to provide means for obtaining improved uniform functioning in different sections between the active cooperating pressure bearing surfaces; to provide means such that the ends of the rings sections are substantially free to move, and do not hump at their ends and scrape on the rotating member; to provide means for improving the performance and reliability of the device and for reducing the wear and tear and consequently the maintenance costs; and to provide a thrust bearing capable of effective operation for different and variable thrusts.

According to the illustrated embodiment of the invention provision is made for a thrust bearing comprising a plurality of separate elastic plates provided in one or more concentric circles on a stationary member, each of said separate plates being supported at its opposite ends on the stationary member but being unsupported between these end supports so that it may be deformed and each of said plates having an abutting surface part or pad on the opposite side from said supports and suitably located between such end supports so that the axial thrust or pressure applied thereto bends the plates to form enlarged wedge-shaped pressure and lubricating spaces between such abutting surfaces on the front sides of the elastic plates and the rotating member. It follows from this arrangement that each of the separate plates acts absolutely independently of the others and does not influence or interfere with their function.

Preferably, the plates are provided in two or more concentric circles but in certain cases, it may be sufficient to provide plates in one circle only or at certain points only of a circle. By providing plates in at least two concentric circles their action is made substantially uniform and independent and this arrangement is particularly adapted for sustaining large and variable thrusts. Due to such arrangement wedge-shaped pressure and lubricating spaces are formed along a a plurality of separate concentric plates of relatively small width capable of operation with relatively high specific pressure (per unit of pressure surface) and also with relatively high speed of rotation, relatively small over-all widths of the pressure surfaces and relatively small bearing diameters being obtained.

The invention also contemplates the provision of holding means at the ends of the elastic plates to avoid upward bending of their ends thus providing for improved operation, reduction of wear and tear and suitable shaping of the lubricating and abutting surfaces.

Other objects and advantages will hereinafter appear.

In the drawings:

Fig. 1 is a partial longitudinal section through a thrust bearing embodying the present invention;

Fig. 2 is a top view showing the elastic bearing plates and pads of a stationary bearing member arranged in two concentric circles;

Fig. 3 is circumferential section through the stationary bearing part supporting the elastic plates collectively forming concentric rings.

Fig. 3A is a vertical section through the end of an elastic plate section and through a washer and bolt used to hold the elastic plate section against the top of the risers supporting the elastic plate sections.

Fig. 4 is a smaller section with modifications through a stationary bearing part of a modification of the invention;

Fig. 5 is a similar section showing a further modification; and

Fig. 6 is a partial longitudinal section through a thrust bearing of the modification as shown in Figs. 4 and 5.

As herein disclosed, a rotary member 1, such as a shaft, is held against movement, due to thrust or axial pressure, by means including an annular member 2 fixed on rotary member 1 and from which such pressure is transmitted through intermediate elements to a stationary member 3. Preferably the annular member 2 is substantially rectangular in section and is integral with the rotary member 1.

The thrust, of which the direction is indicated by an arrow on Fig. 1, is transmitted to projecting parts or pads 4 located on elastic plates 5 arranged around a suitable groove in the stationary member 3. As shown in Figs. 1 and 2, the elastic plates 5 are arranged in two concentric circles and the ends of the plates are supported on risers or ribs 7 projecting from the bottom of suitable groove and the plates 5 are thereby spaced from the bottom of the groove to form clearance spaces 5'. The elastic plates 5 are of relatively small width and the outer edges of the plates of the inner set and the inner edges of the plates of the outer set constitute abutting surfaces so that substantially no clearance exists therebetween and there will be a minmum of leakage of lubricating material. There may be clearance between the ends of adjacent plates 5.

Provision is made to hold plates 5 against the risers or ribs 7 by means of countersunk bolts 7' in countersunk washers 7² countersunk in cut out section 7³ of the ends of plates 5 but leaving the ends of plates 5 substantially free to pull away.

The pads 4 may be of any suitable material such as Babbitt metal and there is one pad for each plate 5 placed near one end thereof but far enough from the corresponding supporting riser 7 to permit bending of the plate. The ends of the plates 5 on which the pads 4 are placed is determined by the direction of rotation of the member 1, indicated by the arrow on Fig. 2. The reason for this arrangement will be brought out hereinafter.

The thrust or pressure transmitted from the rotary member 1, in the direction indicated by the arrow on Fig. 1, to the pads 4 on the elastic plates will cause the latter to be deformed or bent back into the clearance spaces back of the same and the ends of the pads 4 farthest from the supports will be moved slightly away from the adjacent surface of the annular member 2 thus forming automatically somewhat wedge-shaped spaces between the abutting surfaces of the pads 4 and the annular member 2, the extent to which this action takes place being dependent upon several factors such as the weight of the rotary member, the axial thrust, the distance between each pad 4 and the adjacent support or riser 7, the distances between the risers 7, and the thickness and elasticity of the plates 5 and the substantially free movement of the end of the plates 5 and the width of the relatively narrow concentric ring sections 5.

The wedge-shaped spaces formed between the adjacent surfaces of the annular member 2 and of the pads 4 constitute part of a pressure and lubricating system. It should be understood that the pads 4 are near the ends of plates 5 farthest along in the direction of rotation of the member 1 but short of the radial risers so that the member 1 by its own weight against the leaving edges of the abutting pads forces away the rest of the surface area of the relatively abutting pads forming relatively small wedge like spaces which are enlarged through pressures created by the rotation of the rotary member 1 forcing lubricant from between the surfaces of the pads 4 and the surface of the rotary member 1. The lubricating fluid, principally oil by means of the wedge shaped lubricant pressure films created by the rotary member seeking to expel the lubricant from between the abutting surfaces, keeps the rotor or rotary member 1 in equilibrium and at the same time lubricates the supporting and abutting active bearing surfaces. This effect is obtained by a relatively thin oil film of high internal pressure, serving to keep the metallic surfaces apart, to lubricate said surfaces and to counteract the axial thrust. The compression of the lubricant between the abutting elements is very high and depends upon such factors as the shape of the wedge-like spaces produced by the thrust, the speed of rotation of the rotary member 1, the quality of the lubricating fluid, and the uniform action of the separate independently acting concentric ring sections.

According to the present invention as illustrated in Figs. 1 to 3, the wedging action, automatic pressure generation, balancing and lubrication are obtained principally by the use of a plurality of bearing pads 4 on separate and independent elastic members or plates 5, each being supported at opposite ends by risers or ribs 7, which constitute common supports for the adjacent ends of successive plates, and being unsupported between said risers.

The annular member 2 may be integral with the shaft 1 or may be a separate element attached to the shaft in any suitable manner. In Fig. 1 there is shown a shaft bearing part 8 which is combined with the thrust bearing part or stationary member 3 in a simple and economical manner. The ring segment plates 5 of the outer and inner circles are made by cutting elastic ring plates of suitable size into suitable plates or segments 5 or in certain cases the plates of the inner and outer sets may be produced by cutting from the same from ring plates of different sizes in accordance with the requirements of the plates for the inner and outer sets. In Fig. 3 there is shown a part 9 for securing each end plate 5 of an elastic plate group.

In Figs. 4 and 5 are shown modifications in which the bending up of the ends of the elastic plates is avoided by holding or securing each plate at both ends. In Fig. 4 the ends of the plates 10 are tapered and fitted into corresponding grooves 11 in ribs or supports 12 on a stationary bearing member 13.

According to the modification shown in Fig. 5, provision is made in the ends of elastic plates 14 of grooves or key-receiving openings 15 and the adjacent ends of the elastic plates are fastened together by suitable means such as keys 16 inserted into said openings 15, the elastic plates being secured in position by covers 17 having flanges 18 extending into grooves 19. The elastic plates 14 may have pads 20 bevelled at their entrance ends 21 to facilitate the entrance of the lubricant.

The special kinds of elastic ring segment plates shown in Figs. 4 or 5 may be arranged on a stationary part similar to part 3 of Fig. 1, but in certain cases, for example as shown in Fig. 4, it may be necessary or advantageous to provide separate means for securing or holding the elastic plates against loosening in a radial direction. An example of such an arrangement is shown in Fig. 6 where a separate fastening or securing ring 22 is provided to hold elastic plates 23 in position on a stationary part 24.

It should be understood that any or all of the elastic plates may be held against or secured in position by any suitable means such as screws, bolts and rivets and means answering the same purpose.

It should be understood that while preferred forms of the invention have been disclosed, these forms are merely illustrative of the invention and that modifications and variations may be made in the arrangement and construction of the parts without departing from the spirit of the invention.

Having thus described my invention, I claim:

1. A thrust bearing comprising a rotary member, a stationary member having a plurality of radial risers, separate relatively narrow compressible plates arranged side by side with their ends supported by said risers and unsupported therebetween, means to hold said plates against said risers, said plates forming collectively at least two concentric rings, and relatively small projecting friction pads, one on the top side of each separate plate and abutting the rotary member short of the radial riser at its leaving end, the friction pads in successive rings being side by side within the same radial lines.

2. A thrust bearing comprising a rotary member, a stationary member having a plurality of radial risers, separate relatively narrow compressible plates arranged side by side with their ends supported by said risers and unsupported therebetween, means to hold said plates against said risers, said plates forming collectively at least two concentric rings, and relatively small projecting friction pads, one on the top side of each separate plate and abutting the rotary member short of the radial riser at its leaving end and said abutting pads being the means of bending the compressible plates and thereby changing the plane of the abutting pads.

3. A thrust bearing having a rotary element and a stationary element comprising at least two adjacent abutting concentric rings, each formed by a plurality of ring sections unsupported between their ends, and radial joint supports for said ends, and a relatively small projecting friction pad on each ring section nearer to one end of the ring section than the other.

4. A bearing comprising as one element a main member, radial offsets unitary with said main member and arranged in concentric rings, ring sections side by side and supported at their ends by said offsets and means for holding said ends of the ring sections against the offsets, and raised relatively narrow friction pads arranged side by side in groups in the outline of trapezoids and located in each case near the end of the corresponding ring section furthest along the direction of rotation.

5. In a bearing element a main member having radial spacers arranged circumferentially, a plurality of ring sections arranged in at least two relatively narrow concentric rings arranged side by side, said ring sections supported at their ends by said radial spacers, means for holding said ends of ring sections against said radial spacers and relatively small projecting pads, one for each ring section and arranged thereon, at the end farthest along in the direction of rotation but short of the adjacent radial spacer, corresponding pads on the successive rings abutting at their edges.

6. A thrust bearing comprising a rotary bearing member, a plurality of separate elastic plates arranged circumferentially in a plurality of concentric circles, unitary radial risers supporting said separate elastic plates at their ends but leaving them unsupported therebetween, each of said plates having a relatively small bearing surface part relatively far away from the starting end thereof so that the thrust transmitted to such bearing surface from the rotary member causes such deformation of the elastic plate as to compress incoming lubricant between the bearing surface and the rotating member, and means to hold the ends of said plates against said risers.

7. A thrust bearing comprising a rotary bearing member, a plurality of separate relatively narrow elastic plates to receive the thrust of said rotary part and arranged in a plurality of concentric rings with the plates of adjacent rings in abutting relation, radial supports for the ends of said elastic plates leaving them unsupported therebetween, and a relatively small projecting bearing part on each elastic plate, to abut against said rotary member and located relatively near the end of the elastic plate furtherest along the direction of rotation so that the external forces pressing against the relatively small projecting bearing part will cause deformation of the elastic plate and inclination of plane surfaces between the projecting bearing part and the cooperating rotary bearing part due to the lubricant seeking to escape from between the said surfaces.

8. A thrust bearing comprising a rotary bearing member, a plurality of ring sections to sustain the thrust of said rotary part and arranged in a plurality of concentric rings, supports for the ends of said ring sections leaving them unsupported therebetween, and a projecting relatively small bearing part on each ring section to abut against the rotary member and located nearer to one end of the ring section than the other so that the forces exerted by means of the rotary member against the relatively small bearing part will cause inclination of plane surfaces between the abutting, cooperating bearing part, the lubricant being forced from between said abutting surfaces.

9. A bearing comprising two members one of which rotates relatively to the other, a plurality of separate yielding plates supported by one of said members, said plates being arranged in at least two concentric rings and each of said plates being supported at its forward and rear ends to provide a clearance under its intermediate portion, and a bearing projection on each plate rigidly carried relative thereto and located between the points at which the plate is supported, said bearing projection being adapted to yield with said plate and partake of its flexure and being of less length than the distance between the points at which the plate is supported.

10. A bearing comprising two members one of which rotates relatively to the other, a plurality of separate yielding plates supported by one of said members, said plates being arranged in at least two concentric rings and each ring comprising a plurality of such plates, each of said plates being supported at its forward and rear ends to provide a clearance under its intermediate portion, and a bearing projection on each plate betweeen the points at which the plate is supported and located nearer to one end of the plate than the other and rigidly carried relative to the plate, said bearing projection being adapted to yield with the plate and partake of its flexure.

11. A bearing comprising two members one of which rotates relatively to the other, a plurality of separate yielding plates supported by one of said members, said plates being arranged in at least two concentric rings and each ring comprising a plurality of said plates, each of said plates being supported at its forward and rear ends to provide a clearance under its intermediate portion, and a bearing projection on each plate rigidly carried relative thereto and located between the points at which the plate is supported, said bearing projection being adapted to yield with said plate and to partake of its flexure, each of said bearing projections being of less length than the distance between the points at which the plate is supported and all of the bearing projections on the plates of any ring being in radial alignment with the corresponding bearing projections on the other rings.

GERHARD FLINTERMANN.